March 7, 1933.  W. C. REED  1,900,585

TERMINAL FOR ELECTRICAL CONDUCTORS

Filed July 21, 1930

Inventor:
Walter C. Reed,
by Charles V. Mullen
His Attorney.

Patented Mar. 7, 1933

1,900,585

UNITED STATES PATENT OFFICE

WALTER C. REED, OF DALTON, MASSACHUSETTS, ASSIGNOR TO GENERAL ELECTRIC COMPANY, A CORPORATION OF NEW YORK

TERMINAL FOR ELECTRICAL CONDUCTORS

Application filed July 21, 1930. Serial No. 469,458.

My invention relates to terminals for electrical conductors.

An object of my invention is to provide an improved terminal of great strength and durability which constitutes an integral part of the conductor of which it forms a part.

A further object of my invention is to provide a cheap terminal of high conductivity.

Another object of my invention is to provide a terminal the construction of which renders it possible to inspect the assembly and thus insure greater safety than it has heretofore been possible to obtain with the well known crushed tube terminal assemblies.

A further object of my invention is to provide a terminal assembly in which the tang or contact portion is provided with flat surfaces, may be given any desired shape, and to which the conductor may be attached at any desired angle.

My invention will be better understood from the following description taken in connection with the accompanying drawing and its scope will be pointed out in the appended claims.

Figure 1:
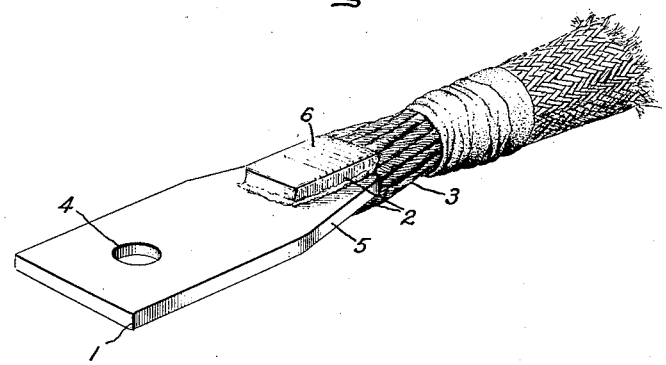
Figure 2:
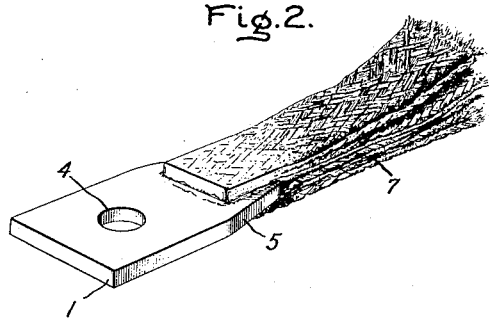
Figure 3:
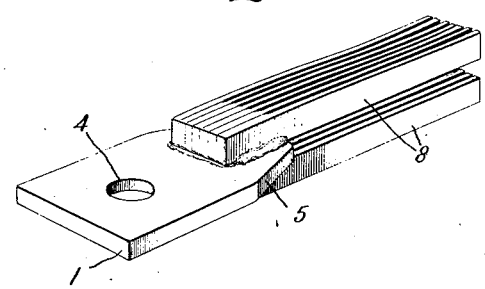

In the accompanying drawing Figs. 1, 2 and 3 are perspective views of three terminal assemblies embodying my invention. Fig. 1 illustrates a terminal assembly for an insulated cable formed of stranded conductors; Fig. 2 an assembly for braided conductors and Fig. 3 an assembly for laminated conductors.

My improved terminal comprises an assembly in which the tang or contact blade of the terminal is formed by the protruding portion of a solid metallic member, a portion of which is inserted between and integrally united to the strands of a conductor. The union between the plate and conductor strands may be made by soldering, brazing or welding, and the strands may be attached to one or more surfaces of the metallic plate although I prefer to have the attachment made to a plurality of opposed surfaces since this construction gives a stronger joint.

Referring to the drawing, the terminal shown in Fig. 1, comprises a plate 1, one end of which is inserted between the divided end portions 2 of a conductor 3 and united integrally therewith by soldering, brazing or welding. The protruding portion of the plate, constituting the tang of the terminal, may be perforated as at 4 for bolting to another terminal or similar connection and the portion 5 inserted between the end portions of the conductor may be tapered to approximately the width of the conductor 3. Prior to performing the operation of soldering, brazing or welding the end strands of the conductor 3 are separated, bunched into groups, prevented from spreading by reenforcing means such as the copper strip 6, and pressed into flat form. The tapered end portion 5 of the plate 1 is then inserted between the bunched strands and the assembly completed by the application of heat and pressure, and in the case of soldering or brazing by the application to the joint of an interjacent metal having a lower melting point than the melting point of the material of the plate or the strands of the cable. Preferably, I employ a high melting point solder or brazing material having melting points between 600 to 875 degrees C. As illustrative of a suitable solder I may employ an alloy comprising 30% silver, 45 to 50% copper and 20 to 25% zinc which will melt at about 725 degrees C. As illustrative of a suitable brazing material I may use an alloy of 11% silver, 55% copper and 34% zinc which melts at about 875 degrees C.

I prefer to complete the joint by using hand operated welding tongs although other means for applying heat and pressure may be used. These tongs comprise jaw members adapted to engage the terminal strands of the conductor on each side of the terminal joint. The jaw members are preferably provided with carbon blocks or equivalent means for localizing the heat at the joint between the terminal plate and the end strands of the conductor. When using welding tongs suitable pressure is applied to the jaw members by applying pressure to the shafts of the tongs by hand or by hand-operated screw and toggle mechanisms acting on the shafts of the tongs. With the parts of the terminal firmly clamped between the jaws of the tongs current is supplied to the jaw members in sufficient volume to accomplish the desired soldering, brazing or welding operation. Since it is desirable to make the joint quickly in order to prevent the heat traveling back from the joint into the insulated part of the cable, fairly heavy currents are usually employed. When using a soldering alloy such as above specified which melts at about 725 degrees C. the joint should be brought to about a temperature of 800 degrees C. After the joint has been made the current is interrupted and after the joint has had an opportunity to cool slightly the tongs are removed. A joint between a copper plate and a copper conductor thus made when examined under a microscope has an interlocked crystal structure which no doubt accounts for the fact that the joint must be heated practically to the melting point of copper before it will open or separate.

In Fig. 2 the terminal assembly there illustrated is between a flat plate 1, such as illustrated in Fig. 1, and several strands of flat braided conductor 7. In making the joint in Fig. 2 half the strands are attached to one side of the plate and the other half of the strands to the other side of the plate at its tapered end portion 5.

In Fig. 3 the terminal assembly there illustrated is made between a plate 1, such as illustrated in Fig. 1, and two groups of laminated conductors 8 which have been divided and attached to the opposite end sides of the tapered end portion 5 of plate 1.

It will be apparent from an examination of the terminals illustrated in the drawing that the joints, whether brazed, soldered or welded, are readily inspected. There is thus little chance of having a faulty joint pass inspection as is often the case when using tube terminals in which the joint is concealed within the tubular portion of the terminal.

Terminals according to my invention are also cheaper to construct than tube terminals or other terminals similar to tube terminals heretofore used because the connecting or tang portion thereof may be cast or sawed or punched from flat stock and made to assume any desired shape found necessary or desirable to satisfy existing conditions requiring special shapes for the connecting portions of the terminals. Furthermore, the connecting portion or tang may be made of material having flat surfaces thereby insuring good electrical contact and minimum heating at the terminal. When tube terminals are used it is necessary to grind the contact surface of the tang in order to secure an equivalent flat surface.

Another advantage of my terminal over that of the crushed tube terminal is its greater conductivity. Tube terminals are made from drawn tubing which is not made of pure copper but contains foreign elements added thereto in an attempt to improve its ductility to facilitate manufacture of the tubing. These added elements increase the resistance of the copper materially. Terminals according to my invention can be made of flat plates or castings of copper having high electrical conductivity since it is not necessary to insure the same ductility in metal used for forming the contact portions of my terminal as in metal for tubing from which crushed tube terminals are made.

In making terminals according to my invention the area of contact between the strands of the conductor and the plate inserted therebetween is generally made greater than the cross sectional area of the conductor. This is done to give the joint greater mechanical strength and to avoid overheating at the joint. By reason of this design the cable, braid or strips making up the conductor will be burnt off on overloads or short circuits before the joint is destroyed, thus insuring an operating connection until the electrical device connected in circuit by said terminals is destroyed. Heretofore it has been difficult to obtain joints that would not open up on overloads thus disconnecting apparatus from a system which might not have otherwise failed on overload. Terminal connections such as above described are of particular utility in making internal and external transformer connections although not limited to this use.

It is also to be noted that the angle between the tang of the terminal and the end of the conductor may be freely varied to suit existing conditions. The desired angularity may be secured by bending the tapered end portion 5 of the plate 1 or by attaching the conductors 3, 7 and 8 to the plate at an angle thereto in the plane of the plate.

While I have shown and described certain particular embodiments of my invention, such modifications and variations are contemplated as fall within the scope of my invention which is set forth in the appended claims.

What I claim as new and desire to secure by Letters Patent of the United States is:

1. A terminal comprising a plurality of end strands of a conductor, and a metallic plate having a portion thereof inserted between said strands and integrally united thereto and a portion thereof protruding from said conductor and constituting the tang of said terminal.

2. A terminal comprising a plurality of end strands of a conductor and a flat plate having a tapered end portion inserted between said strands and integrally united thereto.

3. A terminal comprising a plurality of end strands of a conductor, and a metallic strip one end of which is provided with an opening whereby the same is adapted for mechanical connection to other terminals and the other end of which is tapered to approximately the width of said conductor, inserted between said strands, and integrally united thereto.

4. A terminal comprising a plurality of end strands of a conductor, reenforcing means for dividing said strands into a plurality of groups, and a metallic plate inserted between said groups and integrally united to said reenforcing means and the strands of said groups.

In witness whereof, I have hereunto set my hand this 17th day of July, 1930.

WALTER C. REED.